No. 682,214. Patented Sept. 10, 1901.
P. P. MARTIN.
SEDIMENT COLLECTOR FOR COFFEE POTS, &c.
(Application filed May 15, 1901.)
(No Model.)
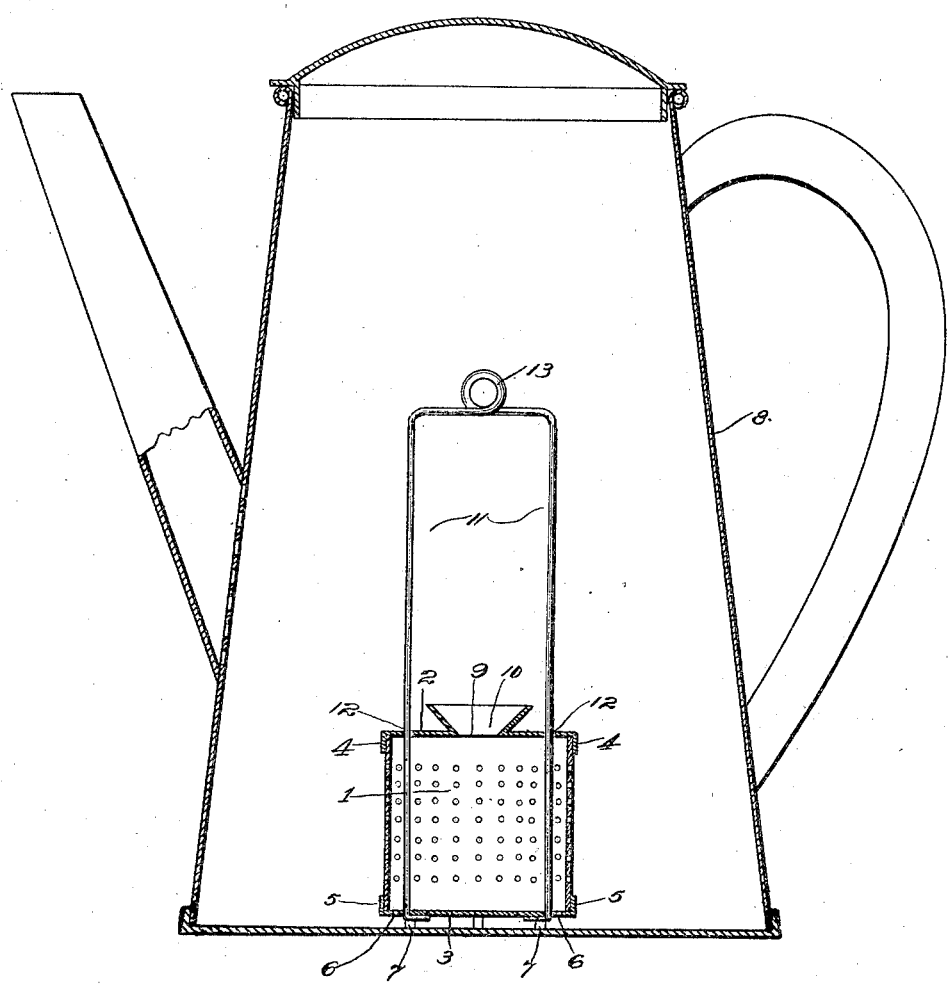

UNITED STATES PATENT OFFICE.

PERCY P. MARTIN, OF SNYDER, TEXAS.

SEDIMENT-COLLECTOR FOR COFFEE-POTS, &c.

SPECIFICATION forming part of Letters Patent No. 682,214, dated September 10, 1901.

Application filed May 15, 1901. Serial No. 60,383. (No model.)

*To all whom it may concern:*

Be it known that I, PERCY P. MARTIN, a citizen of the United States, residing at Snyder, in the county of Scurry and State of Texas, have invented a new and useful Sediment-Collector for Coffee-Pots, &c., of which the following is a specification.

In making tea, coffee, and other beverages there is commonly a sediment at the bottom of the pot—as, for instance, in tea there are the tea-leaves and in coffee there are the coffee-grounds—which sediment is objectionable, as it mixes with the liquid contents of the pot and is poured out therewith. In view of this objection the present invention has for its object to provide means for collecting the sediment, especially of coffee, after the beverage has been made and the coffee-grounds are no longer of use, so that the same may be conveniently removed from the pot, thereby leaving the liquid clear and free from sediment.

With this object in view the present invention consists in the combination and arrangement of parts, as will be hereinafter more fully described, shown in the accompanying drawing and particularly pointed out in the appended claims, it being understood that changes in the form, proportion, size, and minor details may be made within the scope of the claims without departing from the spirit or sacrificing any of the advantages of the invention.

In the drawing there has been shown a central longitudinal sectional view of a coffee-pot with the present device contained therein.

In carrying out the present invention there is provided an open-ended cylindrical perforate body 1, that has its opposite ends closed by means of the top and bottom plates or caps 2 and 3, respectively, which are provided with the cylindrical marginal rims or flanges 4 and 5, that snugly embrace the respective end portions of the body with a frictional grip to prevent accidental displacement of the three parts. The bottom plate or cap is provided with a marginal series of perforations 6, adjacent to the outer edge thereof, and also has a plurality of pendent feet 7 to support the bottom of the device out of contact with the bottom of the pot 8, as plainly illustrated in the drawing. The top cap or plate is provided with a central opening 9, from the walls of which rises an inverted conical hopper or funnel 10 to facilitate the introduction of the sediment into the device.

For the convenient introduction and removal of the device with respect to a pot there is provided a handle in the form of an elongated and inverted substantially U-shaped wire bail 11, the opposite sides of which pass downwardly through corresponding diametrically opposite perforations 12 in the top plate or cap and secured to the bottom plate in any suitable manner. The upper intermediate portion of the bail-handle is formed into an eye or loop 13, whereby the device may be suspended from a hook or other support when not in use.

The present device is designed to be placed within the pot after the coffee has been made and while it is boiling. At this stage the sediment in the bottom of the pot is rising and falling in currents, and when the collector is placed within the center of the pot and upon the bottom thereof the sediment will rise and then pass inwardly toward the center and downwardly into the open funnel 10, whereby the sediment or coffee-grounds are conveniently and effectively collected within the device and may be removed therewith from the pot, thereby leaving the coffee free from sediment and clear. The sides of the device are perforated to permit of the outward passage of the liquid; but such perforations should be sufficiently small as to prevent the sediment from being carried outwardly with the liquid. When the device has been removed from the pot, the contents thereof may be readily discharged by drawing the top outwardly upon the handle as a guide, and separating the top, the bottom, and the body, which separation also facilitates the cleansing of the parts and renders the device thoroughly sanitary. By this peculiar arrangement of parts the latter may be conveniently separated, but are still connected sufficiently to prevent loss or displacement of any part, which is an important and useful feature.

What is claimed is—

1. A device of the class described, having a perforate body, a removable top having an entrance-opening formed therethrough, and a handle rising from the bottom of the body and projected loosely through an opening in the removable top, the latter being slidably mounted upon the projected portion of the handle.

2. A device of the character described, comprising an open-ended perforate cylindrical body, a removable bottom having a marginal cylindrical rim embracing the lower end of the body, a removable top having a marginal cylindrical rim embracing the top of the body, and provided with a pair of diametrically opposite perforations, and a central opening, an inverted conical funnel or hopper rising from the walls of the opening, and an inverted substantially U-shaped handle having its opposite sides passing downwardly and loosely through the corresponding perforations in the top, with their lower ends connected to the bottom, the top being slidably mounted upon the projected handle portion.

In testimony that I claim the foregoing as my own I have hereto affixed my signature in the presence of two witnesses.

PERCY P. MARTIN.

Witnesses:
J. C. REDDELL,
F. A. GRAYSON.